United States Patent
Lee (10) Patent No.: US 11,967,742 B2
(45) Date of Patent: Apr. 23, 2024

(54) APPARATUS AND METHOD FOR MANAGING CONDENSATE OF FUEL CELL

(71) Applicant: HYUNDAI MOBIS Co., Ltd., Seoul (KR)

(72) Inventor: Yong Hee Lee, Yongin-si (KR)

(73) Assignee: HYUNDAI MOBIS CO., LTD., Seoul (KR)

(\*) Notice: Subject to any disclaimer, the term of this patent is extended or adjusted under 35 U.S.C. 154(b) by 111 days.

(21) Appl. No.: 17/549,019

(22) Filed: Dec. 13, 2021

(65) Prior Publication Data

US 2023/0120090 A1     Apr. 20, 2023

(30) Foreign Application Priority Data

Oct. 19, 2021 (KR) .................... 10-2021-0139487

(51) Int. Cl.
*H01M 8/04007* (2016.01)
*H01M 8/0263* (2016.01)
*H01M 8/0432* (2016.01)

(52) U.S. Cl.
CPC ..... *H01M 8/04074* (2013.01); *H01M 8/0263* (2013.01); *H01M 8/04365* (2013.01); *H01M 2250/20* (2013.01)

(58) Field of Classification Search
CPC .......... H01M 8/04074; H01M 8/0263; H01M 8/04365; H01M 8/04067; H01M 8/04268; H01M 8/04723; H01M 8/04738; H01M 8/04029; H01M 8/04007; H01M 8/04037; H01M 8/04156
See application file for complete search history.

(56) References Cited

U.S. PATENT DOCUMENTS

| | | |
|---|---|---|
| 10,964,965 B2 | 3/2021 | Park et al. |
| 2019/0165398 A1* | 5/2019 | Park ............... B60K 11/02 |
| 2019/0252701 A1* | 8/2019 | Okamura ......... H01M 8/04164 |

FOREIGN PATENT DOCUMENTS

| | | |
|---|---|---|
| JP | 2019-139935 A | 8/2019 |
| KR | 10-2019-0060593 A | 6/2019 |
| KR | 10-2304546 B1 | 9/2021 |

OTHER PUBLICATIONS

Extended European Search Report issued in corresponding European Patent Application No. 21214222.8 dated Jun. 2, 2022.
Office Action issued in corresponding Korean Patent Application No. 10-2021-0139487 dated Dec. 21, 2023.

\* cited by examiner

*Primary Examiner* — Stewart A Fraser
(74) *Attorney, Agent, or Firm* — MORGAN, LEWIS & BOCKIUS LLP (57) ABSTRACT

Disclosed is an apparatus for managing condensate of a fuel cell. The apparatus includes a first heater for applying heat to coolant of a fuel cell stack, a second heater for applying heat to the condensate produced in the fuel cell stack, and a controller that controls an operation of the second heater using residual power based on whether at least some of functions of the first heater are activated.

12 Claims, 8 Drawing Sheets

APPARATUS AND METHOD FOR MANAGING CONDENSATE OF FUEL CELL

CROSS-REFERENCE TO RELATED APPLICATION

This application claims the benefit of priority to Korean Patent Application No. 10-2021-0139487, filed in the Korean Intellectual Property Office on Oct. 19, 2021, the entire contents of which are incorporated herein by reference.

TECHNICAL FIELD

The present disclosure relates to an apparatus and a method for managing condensate of a fuel cell.

BACKGROUND

In general, in a polymer electrolyte membrane fuel cell, (PEMFC), condensate is produced in a hydrogen supply system (FPS). That is, water is produced at an air electrode due to movement of hydrogen ions. However, a portion of water flows from the air electrode back to a hydrogen electrode due to a back-diffusion phenomenon. Water leaving the electrode cannot re-enter the air electrode and falls into a fuel water trap (FWT) which is referred to condensate.

When an amount equal to or larger than a certain amount of condensate is collected in the water trap, a fuel drain valve (FDV) water level sensor detects a water level, opens a solenoid valve, and discharges the condensate to an outside.

In a fuel cell passenger vehicle, a vent is located at a lower position than that of the fuel cell, so that condensate discharge is smooth, and there is little risk of water discharge during parking/stop.

In one example, industrial vehicles (construction machines, etc.) often park/stop at indoor work spaces, and there are many enclosed spaces that do not have drainage facilities. Thus, when the fuel cell is turned off, water accumulates on a surrounding floor. Therefore, in the industrial vehicle, a solution for preventing accidents caused by water is required.

SUMMARY

The present disclosure has been made to solve the above-mentioned problems occurring in the prior art while advantages achieved by the prior art are maintained intact.

A purpose of the present disclosure is to provide an apparatus and a method for managing condensate of a fuel cell which is capable of drying the condensate produced in the fuel cell.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

An aspect of the present disclosure provides an apparatus for managing condensate of a fuel cell, the apparatus including a first heater for applying heat to a coolant of a fuel cell stack, a second heater for applying heat to condensate produced in the fuel cell stack, and a controller that controls an operation of the second heater using residual power based on whether at least some of functions of the first heater are activated.

In one embodiment, the second heater may further include a PTC (Positive Temperature Coefficient) heater disposed inside a reservoir tank for storing the condensate therein.

In one embodiment, the second heater may further include a PTC heater having a cylindrical shape disposed inside a pipe in which the condensate flows.

In one embodiment, the controller may operate the first heater to perform a COD (Cathode Oxygen Depletion) function when an outside temperature is lower than a predefined temperature while the fuel cell stack operates.

In one embodiment, the controller may operate the second heater to perform the COD (Cathode Oxygen Depletion) function when the outside temperature is higher than or equal to the predefined temperature while the fuel cell stack operates.

In one embodiment, the controller may operate the second heater with residual power when a SOC (state of charge) of a battery exceeds a predefined limit value while the battery is being charged with power generated during regenerative braking.

In one embodiment, the controller may selectively enable different types of relays connected to the first heater based on the functions of the first heater such that a function of the first heater corresponding to a selected type of relay among the different types of relays is performed. When the controller controls the operation of the second heater using the residual power based on whether the at least some of functions of the first heater are activated, the controller may disable the first heater and then enable the second heater.

An aspect of the present disclosure provides a method for managing condensate of a fuel cell, the method including operating a first heater to apply heat to a coolant of a fuel cell stack, controlling an operation of a second heater using residual power based on whether at least some of functions of the first heater are activated, and operating the second heater to apply heat to condensate produced in the fuel cell stack.

In one embodiment, the method may further include operating the first heater to perform a COD (Cathode Oxygen Depletion) function when an outside temperature is lower than a predefined temperature while the fuel cell stack operates.

In one embodiment, the method may further include operating the second heater to perform the COD (Cathode Oxygen Depletion) function when the outside temperature is higher than or equal to the predefined temperature while the fuel cell stack operates.

In one embodiment, the method may further include operating the second heater with residual power when a SOC (state of charge) of a battery exceeds a predefined limit value while the battery is being charged with power generated during regenerative braking.

In one embodiment, the method may further include selectively enabling different types of relays connected to the first heater based on the functions of the first heater such that a function of the first heater corresponding to a selected type of relay among the different types of relays is performed. The controlling of the operation of the second heater using the residual power based on whether the at least some of functions of the first heater are activated may further include disabling the first heater and then enabling the second heater.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the present disclosure will be described with reference to the accompanying drawings. However, this is not intended to limit the present disclosure to specific embodiments. It should be understood that the present disclosure includes various modifications of, equivalents to, and/or alternative to embodiments of the present disclosure.

Various embodiments of the disclosure and terms used therein are not intended to limit the technical features as described in the present disclosure to specific embodiments. It should be understood that the disclosure includes various changes of, equivalents to, or substitutes with the embodiments.

In connection with the description of the drawings, like reference numerals may be used for similar or related components. As used herein, the singular forms "a" and "an" are intended to include the plural forms as well, unless the context clearly indicates otherwise.

As used herein, each of phrases "A or B", "at least one of A and B", "at least one of A or B", "A, B or C", "at least one of A, B and C" and "at least one of A, B, or C" may include any one of items listed together a corresponding phrase, or all possible combinations thereof.

It will be understood that, although the terms "first", "second", "third", and so on may be used herein to describe various elements, components, regions, layers and/or sections, these elements, components, regions, layers and/or sections should not be limited by these teams. These terms are used to distinguish one element, component, region, layer or section from another element, component, region, layer or section. Thus, a first element, component, region, layer or section described below could be teamed a second element, component, region, layer or section, without departing from the spirit and scope of the present disclosure. When one component (e.g., a first component) is "functionally" or "communicatively" "coupled" or "connected" to another component (e.g., a second component), or when one component (e.g., a first component) is "coupled" or "connected" to another component (e.g., a second component), this means that the first component may be connected directly (e.g., in a wired manner), wirelessly, or via a third component, to the second component.

Figure 1:
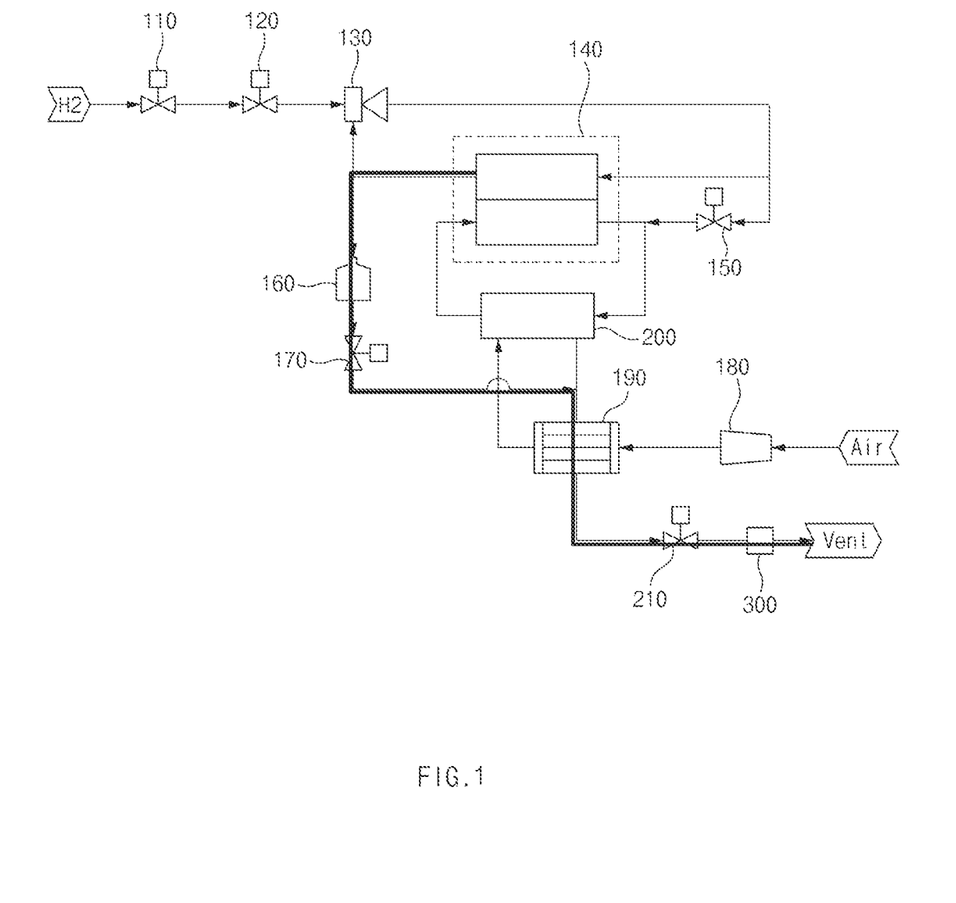
FIG. 1 is a diagram showing a fuel cell system according to one embodiment of the present disclosure.

FIG. 1 is a diagram showing a fuel cell system according to one embodiment of the present disclosure.

Referring to FIG. 1, the fuel cell system according to one embodiment of the present disclosure may include a hydrogen supply H2, a hydrogen blocking valve 110, a hydrogen supply valve 120, an ejector 130, a fuel cell stack 140, a hydrogen purge valve 150, a water trap 160, a condensate valve 170, an air supplier 180, a humidifier 190, an air blocking valve 200, a pressure adjustment valve 210 and a condensate managing apparatus 300.

The hydrogen supply H2 may be configured to supply hydrogen as fuel to the fuel cell stack 140, and may include a hydrogen tank (not shown) in which hydrogen is stored, and a regulator (not shown). Hydrogen may flow into the fuel cell stack 140 along a pipeline of a hydrogen supply system extending from the hydrogen tank.

The hydrogen tank may store therein high-pressure hydrogen gas at about 700 bar.

The regulator may reduce a pressure of the high-pressure hydrogen stored in the hydrogen tank to about 17 bar, and may supply the pressure-reduced hydrogen to a rear end of the regulator.

The hydrogen blocking valve 110 and the hydrogen supply valve 120 may be provided at a rear end of the regulator along the pipeline of the hydrogen supply system.

The hydrogen blocking valve 110 may be an NC (normally-closed) type valve. The hydrogen blocking valve 110 may be a valve to cut off hydrogen that may be discharged from the hydrogen tank in an emergency.

The hydrogen supply valve 120 may control a pressure of the hydrogen to be supplied to the fuel cell stack 140. The hydrogen supply valve 120 may be embodied as a solenoid type valve that may be driven by an electromagnet. The hydrogen supply valve 120 may be connected to the fuel cell stack 140 via a pipe formed at a rear end of the hydrogen supply valve 120.

The ejector 130 may supply low-pressure hydrogen supplied through the hydrogen supply H2 to the fuel cell stack 140.

The ejector 130 may mix hot and humid hydrogen discharged from a hydrogen electrode of the fuel cell stack 140 with dry hydrogen supplied from the hydrogen supply H2 and then supply the mixture to the hydrogen electrode of the fuel cell stack 140.

The fuel cell stack 140 is capable of generating electricity using a chemical reaction of hydrogen and oxygen. The fuel cell stack 140 may include a membrane electrode assembly (MEA) in which a catalyst electrode layer in which an electrochemical reaction occurs is attached to each of both opposing faces of an electrolyte membrane, and the hydrogen electrode (anode) stacked on one face of the membrane electrode assembly and receiving hydrogen as a fuel, and an air electrode (cathode) stacked on the other face of the membrane electrode assembly and receiving oxygen as an oxidizing agent.

Condensate produced according to the electrochemical reaction in the fuel cell stack 140 is produced inside the fuel cell stack 140, and should be smoothly discharged to the vent through a condensate discharge path outside the fuel cell stack 140.

When the condensate is not well discharged from the inside of the fuel cell stack 140, that is, is in a flooding state, this may interfere with supply of the hydrogen as the fuel to reduce power generation performance of the fuel cell stack 140. In severe cases, the fuel cell stack 140 may be damaged.

In order to discharge the condensate of the hydrogen electrode, a flow amount of the hydrogen inside the fuel cell stack 140 should be increased to increase a flow rate of fluid (mixed gas containing moisture) in the fuel cell stack 140.

In this connection, the most widely used approach is periodic hydrogen purge. That is, when the moisture in the fuel cell stack 140 should be removed, the moisture may be purged through the condensate valve 170 to temporarily increase a flow amount of the hydrogen in the fuel cell stack 140.

Gas containing hydrogen discharged from the hydrogen electrode may be recirculated back to the hydrogen electrode through the ejector 130, and the remainder may be discharged to the outside through the water trap 160 and the condensate valve 170, etc.

The hydrogen purge valve 150 may discharge a portion of hydrogen unnecessary for the reaction in the fuel cell stack 140 to the atmosphere.

The water trap 160 may store therein the condensate.

The condensate valve 170 is a valve for discharging the condensate stored in the water trap 160 to the outside. The condensate valve 170 may be embodied as a solenoid type valve that may be driven by an electromagnet.

The air supplier 180 may produce compressed air by rotating an air supply motor 191 which is a BLDC (Brushless Direct Current) three-phases motor using a high-voltage, and may control the BLDC motor up to 100,000 RPM through BPCU (Blower Pump Control Unit). The compressed air produced by the air supplier 180 may be supplied to the humidifier 190.

The humidifier 190 may be provided between an air supply line and an air discharge line connected to the air electrode of the fuel cell stack 140 to humidify the air supplied to the air electrode along the air supply line.

The humidifier 190 may exchange moisture between air introduced thereto in a dry state through the air supplier 180 and flowing along the air supply line and air discharged in a humid state from the air electrode and flowing along the air discharge line, thereby humidifying the air flowing in the air supply line.

The air blocking valve 200 may perform an opening or closing operation so that the air supplied from the humidifier 190 flows to the fuel cell stack 140 or is blocked.

When the air blocking valve 200 is open during vehicle startup (IGN ON), the air blocking valve 200 may supply the air supplied from the humidifier 190 to the air electrode of the fuel cell stack 140 or may discharge the air used in the fuel cell stack 140 to the humidifier 190.

The air blocking valve 200 is brought into a closed state when the vehicle starts ends (IGN Off). Thus, the air blocking valve 200 blocks flow of the air to prevent the air from being supplied to the fuel cell stack 140. A movable range in which the air blocking valve 200 changes from the closed state to the open state may be 0 to 90 degrees.

The pressure adjustment valve 210 may be provided in a discharge path of the condensate, and may adjust the pressure of the air discharged from the air electrode.

The apparatus 300 for managing the condensate may be provided in the discharge path of the condensate as a rear end of the pressure adjustment valve 210, and may dry the condensate passing through the discharge path of the condensate. According to various embodiments, the apparatus 300 for managing condensate may be provided at a front end of the pressure adjustment valve 210. The present disclosure is not limited thereto. The apparatus 300 for managing condensate may be provided at various locations of the discharge path of the condensate.

Figure 2:
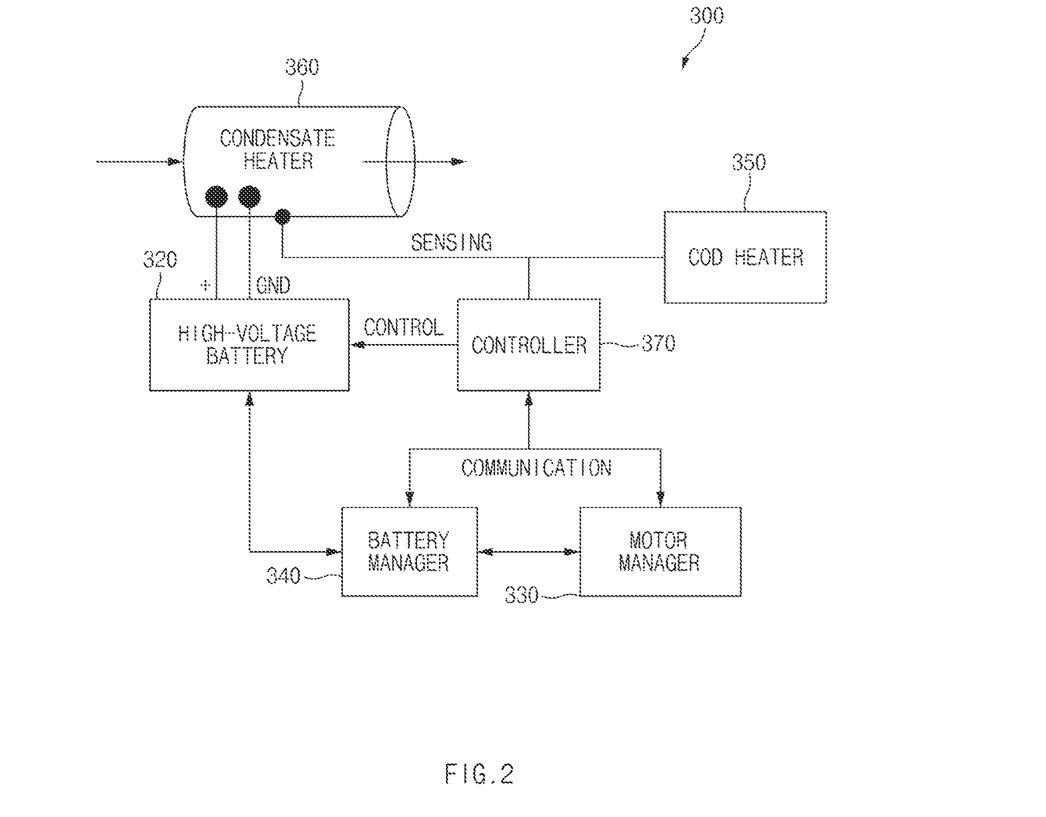
FIG. 2 is a diagram showing an apparatus for managing condensate of a fuel cell according to one embodiment of the present disclosure.
Figure 3:
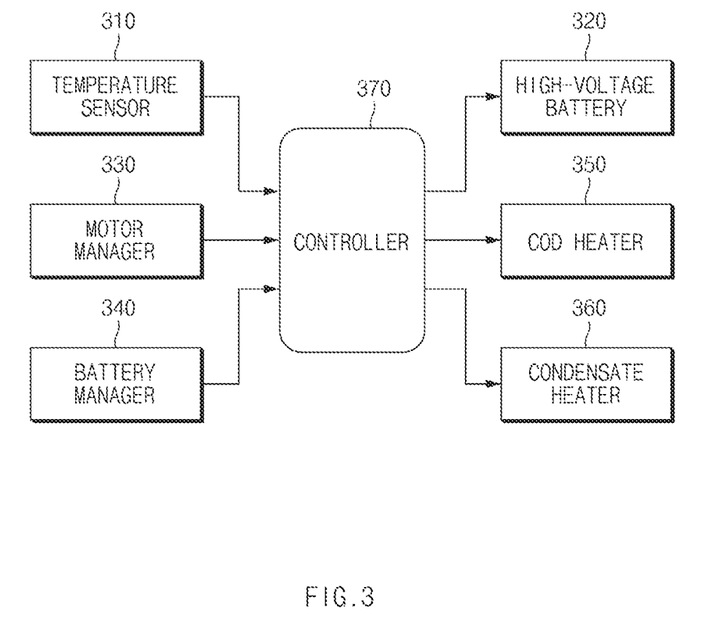
FIG. 3 is a block diagram showing an apparatus for managing condensate of a fuel cell according to one embodiment of the present disclosure.

FIG. 2 is a diagram showing an apparatus for managing condensate of a fuel cell according to one embodiment of the present disclosure. FIG. 3 is a block diagram showing the apparatus for managing the condensate of the fuel cell according to one embodiment of the present disclosure.

Referring to FIG. 2 and FIG. 3, the apparatus for managing the condensate of the fuel cell according to one embodiment of the present disclosure may include a temperature sensor 310, a high-voltage battery 320, a motor manager 330, a battery manager 340, a COD heater 350, a condensate heater 360 and a controller 370.

The temperature sensor 310 may measure an outside air temperature.

The high-voltage battery 320 may be charged with energy regenerated during braking of the fuel cell vehicle. That is, when the fuel cell vehicle drives, power is recovered from the motor via regenerative braking and thus the energy may be charged in the high-voltage battery 320.

In one example, when the driving of the fuel cell vehicle continues, a SOC (State Of Charge) of the high-voltage battery 320 due to regenerative braking reaches a predefined limit (e.g. 85% or greater). In this case, it may be determined that charging has been completed. When the SOC of the high-voltage battery exceeds the predefined limit, the battery may no longer be charged and thus, the regenerative braking becomes impossible.

For reference, a combination of the fuel cell stack 140 and the high-voltage battery 320 are used as a main power source for driving a motor in a general fuel cell vehicle. That is, there are two main power sources. Thus, when an error occurs in one power source for some reasons, the fuel cell vehicle may perform emergency driving only with the fuel cell stack 140 or the emergency driving using only the high-voltage battery 320 to move to a safe place. This may be referred to as a fail-safe function.

The motor manager 330 consumes power required in the high-voltage system and drives a fuel cell vehicle motor (not shown). The motor manager 330 supplies current generated by the fuel cell vehicle motor to the high-voltage system during regenerative braking to charge the high-voltage battery 320. The motor manager 330 may include MCU (Motor Control Unit) or VCU (Vehicle Control Unit).

The battery manager 340 provides SOC information as charged state information about the high-voltage battery 320. The battery manager 340 may include BMS (Battery Management System).

The COD heater 350 may have four functions: COD (Cathode Oxygen Depletion) function, cold start function, regenerative braking function, and rapid high-voltage exhaust function.

According to an embodiment, when the fuel cell vehicle is turned off and the fuel cell stack 140 is shut down, residual hydrogen and oxygen in the fuel cell stack 140 may be present. The residual hydrogen and oxygen may reduce durability of the fuel cell stack 140. In this connection, the residual hydrogen and oxygen may react with each other in the fuel cell stack 140 and thus generated power may be consumed by the COD heater 350, thereby increasing the durability of the fuel cell stack 140. This function of the COD heater 350 may be defined as a COD (Cathode Oxygen Depletion) function.

In addition, according to the embodiment, in order to smoothly generate electric power in the fuel cell stack 140 after starting the fuel cell vehicle at a sub-zero ambient temperature, the temperature of the fuel cell stack 140 may be raised up by heating a coolant using a heating element of the COD heater 350, thereby normalizing output performance of the fuel cell stack 140. This function of the COD heater 350 may be defined as a cold start function.

In addition, according to an embodiment, the power generated during regenerative braking of the fuel cell vehicle is charged to the high-voltage battery 320. When the SOC of the high-voltage battery 320 is high, the COD heater 350 may forcibly consume the regenerative energy due to heating thereof. This function of the COD heater 350 may be defined as a regenerative braking function.

In addition, according to the embodiment, when the fuel cell vehicle has an impact on the high-voltage battery 320 due to an accident, etc., thereby causing insulation-breakdown of the high-voltage battery 320, the high-voltage flows through a chassis or a frame of the fuel cell vehicle. Thus, there is a risk of electric shock. In this connection, after shutting off the high-voltage system, the residual power of the high-voltage battery 320 is consumed by the COD heater 350 to prevent electric shock. This function of the COD heater 350 may be defined as a rapid high-voltage exhaustion function. For example, this function may reduce the power remaining in the high-voltage battery 320 to a level lower than DC 60V or AC 30V within 60 seconds after collision of the fuel cell vehicle.

The condensate heater 360 may dry the condensate produced in the fuel cell stack 140 via heating thereof. For example, the condensate heater 360 may use a PTC (positive temperature coefficient) heater. When the PTC heater is used as the condensate heater 360, heat may be generated without an additional power device or without consumption of the output of the fuel cell stack 140. Thus, there are advantages in that a cost may be reduced and control may be easily performed.

The condensate heater 360 may operate using power obtained based on the functions (i.e., the COD function, the regenerative braking function, and the rapid high-voltage exhaust function) of the COD heater 350 except for the cold start function. For example, the condensate heater 360 may operate using the remaining power that is not consumed when the functions other than the cold start function are not used.

That is, the condensate heater 360 may be activated upon receiving power generated when the residual hydrogen and oxygen in the fuel cell stack 140 react with each other when the fuel cell vehicle is turned off and the fuel cell stack 140 is shut down. Further, when the SOC of the high-voltage battery 320 is high, the condensate heater 360 may be activated upon receiving power generated during regenerative braking of the fuel cell vehicle. Further, the condensate heater 360 may be activated upon receiving the residual power of the high-voltage battery 320 in an event of the insulation-breakdown of the high-voltage battery 320 because an impact occurs on the high-voltage battery 320 due to an accident of the fuel cell vehicle.

The controller 370 of the apparatus according to an exemplary embodiment of the present disclosure may be a processor (e.g., computer, microprocessor, CPU, ASIC, circuitry, logic circuits, etc.). The controller 370 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 370 may process a signal transmitted between the components of the fuel cell control device. The controller 370 may include a fuel cell control unit (FCU). The controller 370 may receive status information of the fuel cell vehicle through the motor manager 330, and may receive the charged status of the high-voltage battery 320 through the battery manager 340. The controller 370 may control the condensate heater 360 to operate using the remaining power that is not consumed when the functions other than the cold start function of the COD heater 350 are not used.

Figure 4:
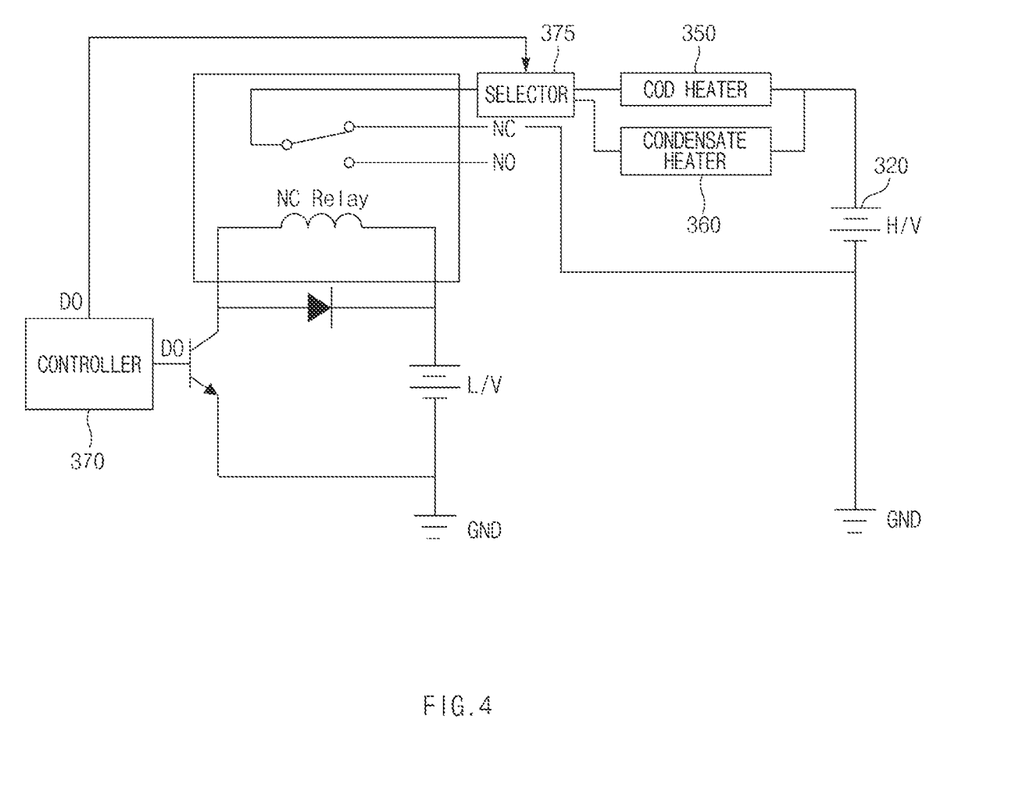
FIG. 4 and FIG. 5 are diagrams for illustrating an operation of an apparatus for managing condensate of a fuel cell according to one embodiment of the present disclosure.
Figure 5:
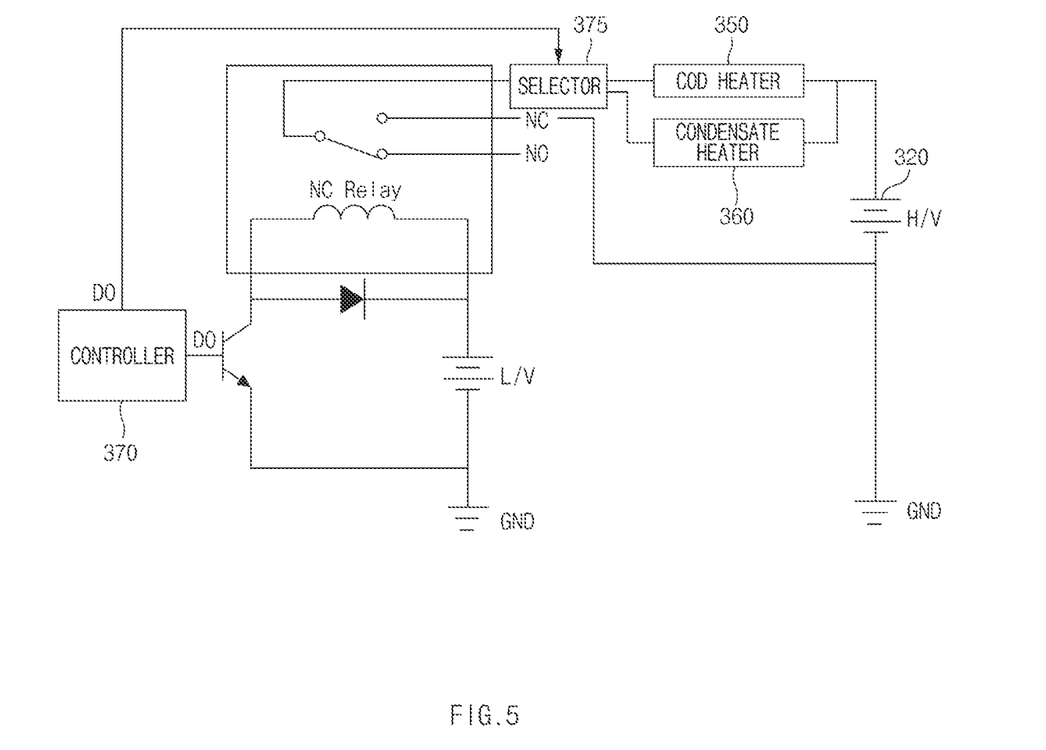

FIG. 4 and FIG. 5 are diagrams for illustrating the operation of the apparatus for managing the condensate of the fuel cell according to one embodiment of the present disclosure.

Referring to FIG. 4 and FIG. 5, the COD heater 350 in a high-voltage circuit may be connected to a relay circuit selectively embodied as an NC (Normally Connected) type circuit or an NO (Normally Open) type circuit. That is, the COD heater 350 in the NC type in FIG. 4 operates to perform the COD function, and the COD heater 350 in the NO type in FIG. 5 may operate to perform the cold start function, the regenerative braking function, and the rapid high-voltage exhaustion function.

The condensate heater 360 may be connected in parallel with the COD heater 350. That is, the condensate heater 360 may operate regardless of whether the COD heater is connected to the NC type relay circuit or the NO type relay circuit.

The controller 370 may control a selector 375 to select whether to operate the COD heater 350 or to operate the condensate heater 360. Therefore, when the COD heater 350 is selected to operate, the condensate is not dried. Otherwise, when the condensate heater 360 is selected to operate, the condensate may be dried.

The controller 370 allows the NC type relay circuit to be connected to the condensate heater 360 when there is no residual power. When the residual power is generated, the controller 370 allows the NO-type relay circuit to be connected to the condensate heater 360. That is, when a lot of condensate is produced in a situation where the residual power is not generated, the controller 370 may allow the NC type relay circuit to be connected to the condensate heater 360 so that the condensate heater 360 generates heat.

When the outside temperature exceeds a predefined temperature, the COD function may be performed by the condensate heater 360. For example, when the outside temperature exceeds 15° C., the controller 370 may select the NC type relay circuit and then may control the selector 375 to select the condensate heater 360 so that the condensate heater 360 performs the OD function.

To the contrary, when the outside temperature is lower than the predefined temperature, the COD function may be performed by the COD heater 350. For example, when the outside temperature is lower than 15° C., the controller 370 may select the NC type relay circuit and then may control the selector 375 to select the COD heater 350 so that the COD heater 350 performs the COD function.

When a cold start condition is met, the controller 370 may disable the COD function but may enable the cold start function. For example, when the outside temperature is below zero, the controller 370 may select the NO type relay circuit and then may control the selector 375 to select the COD heater 350 such that the COD heater 350 performs the cold start function.

The controller 370 may operate the condensate heater 360 using residual power when the SOC of the high-voltage battery 320 exceeds the predefined limit value while the high-voltage battery 320 is being charged with the power generated during regenerative braking. For example, when the SOC of the high-voltage battery 320 exceeds 85% while the high-voltage battery 320 is being charged with the power generated during regenerative braking, the controller 370 may select the NO type relay circuit and then may control the selector 375 to select the condensate heater 360 such that the condensate heater 360 operates using the residual power.

Thus, both when the outside temperature exceeds the predefined temperature such that the condensate heater 360 performs the COD function, and when the condensate heater 360 operates using the residual power when the SOC of the high-voltage battery 320 exceeds the predefined limit value while the high-voltage battery 320 is being charged with the power generated during regenerative braking, the condensate heater 360 may be heated to dry the condensate.

In addition, the controller 370 may control at least one further component (e.g., a hardware or software component) of the apparatus for managing the condensate of a fuel cell, and may perform various data processing or computing.

According to one embodiment, at least a portion of the data processing or computing may include storing, by the controller 370, a command or data received from another component (e.g., a sensor) in a volatile memory, processing, by the controller, the command or data stored in the volatile memory, and storing, by the controller, the result data in a non-volatile memory).

According to one embodiment, the controller 370 may include a main processor (e.g., a central processing unit or an application processor) or an auxiliary processor (e.g., a graphic processing unit, an image signal processor, a sensor hub processor, or a communication processor) capable of operating independently or together with the main processor. For example, when the controller 370 includes the main processor and the auxiliary processor, the auxiliary processor may use a smaller power amount than a power amount that the main processor uses, or may be specialized in a specified function. The auxiliary processor may be implemented separately from or as a part of the main processor.

Although not shown in the drawings, according to embodiments, the apparatus for managing the condensate of the fuel cell may further include storage.

The storage may store therein instructions, a control command code, control data, or user data for controlling the apparatus for managing the condensate of the fuel cell. For example, the storage may store therein at least one of an application program, an OS (operating system), middleware, or a device driver.

The storage may include at least one of a volatile memory, or a non-volatile memory.

The volatile memory may include DRAM (dynamic random access memory), SRAM (static RAM), SDRAM (synchronous DRAM), PRAM (phase-change RAM), MRAM (magnetic RAM), RRAM (resistive RAM), FeRAM (ferroelectric RAM), and the like.

The nonvolatile memory may include ROM (read only memory), PROM (programmable ROM), EPROM (electrically programmable ROM), EEPROM (electrically erasable programmable ROM), a flash memory, and the like.

The storage may further include a nonvolatile medium such as a hard disk drive (HDD), a solid state disk (SSD), eMMC (embedded multimedia card), or UFS (universal flash storage).

Figure 6:
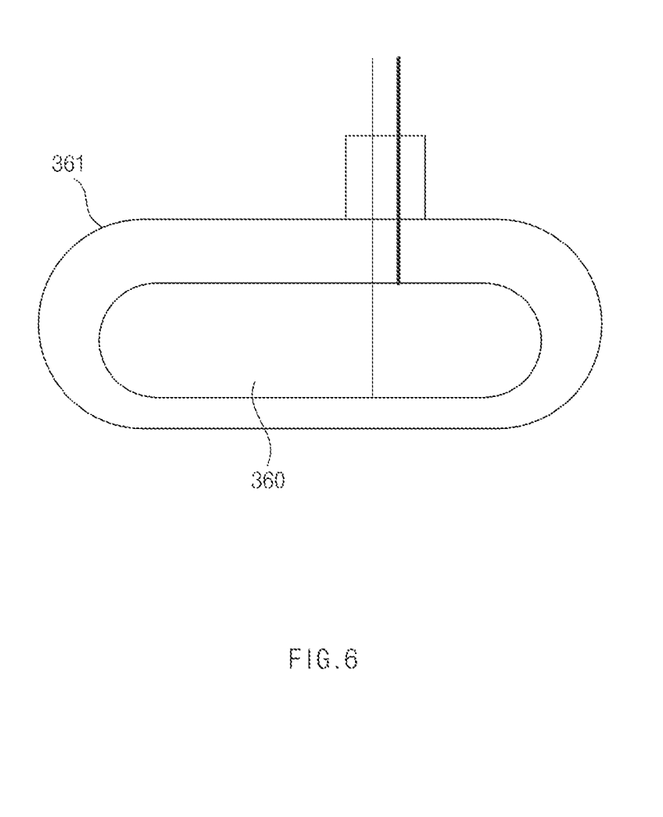
FIG. 6 and FIG. 7 are diagrams for illustrating a condensate heater constituting an apparatus for managing condensate of a fuel cell according to one embodiment of the present disclosure.
Figure 7:
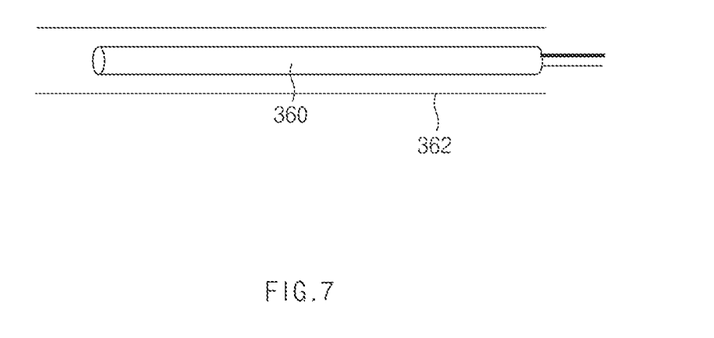

FIG. 6 and FIG. 7 are diagrams for illustrating the condensate heater constituting the apparatus for managing the condensate of the fuel cell according to one embodiment of the present disclosure.

Referring to FIG. 6, the condensate heater 360 may be embodied as a plate-shaped PTC heater inside a reservoir tank 361 for storing condensate therein. Therefore, when the condensate is stored in the reservoir tank 361, the condensate may be dried using the heat from the plate-shaped PTC heater.

Referring to FIG. 7, the condensate heater 360 may be embodied as a cylindrical PTC heater inside a pipe 362 through which the condensate flows. In this case, a pipe of an exhaust port is long as in an excavator or a fork crane. Due to the heat from the cylindrical PTC heater, the condensate passing through the pipe may be dried while contacting the PTC heater.

Hereinafter, a method for managing condensate of a fuel cell according to another embodiment of the present disclosure will be described in detail with reference to FIG. 8.

Figure 8:
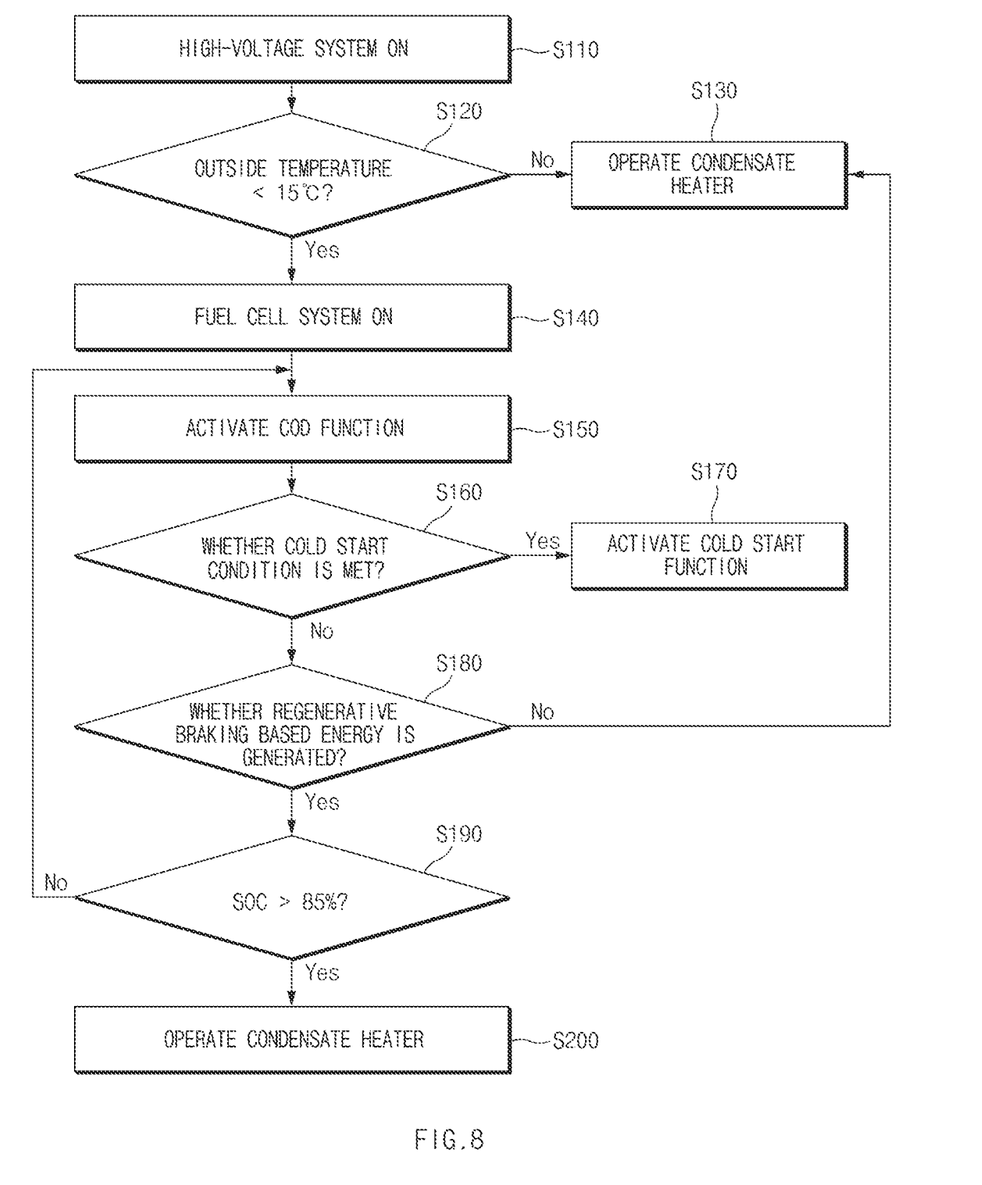
FIG. 8 is a flowchart for illustrating a method for managing condensate of a fuel cell according to one embodiment of the present disclosure.

FIG. 8 is a flowchart for illustrating a method for managing condensate of a fuel cell according to one embodiment of the present disclosure.

Hereinafter, it is assumed that the apparatus for managing the condensate of the fuel cell of FIG. 2 performs the process of FIG. 8.

First, a high-voltage system is turned on in S110. When the outside temperature exceeds the predefined temperature in S120, the controller 370 selects the NC-type relay circuit and then controls the selector 375 to select the condensate heater 360 so that the condensate heater 360 performs the COD function in S130.

Otherwise, when the outside temperature is lower than the predefined temperature in S120, the fuel cell system is turned on in S140, and the controller 370 selects the NC type relay circuit and then controls the selector 375 to select the COD heater 350 such that the COD heater 350 performs the COD function in S150.

When the cold start condition is met in S160, the controller 370 selects the NO type relay circuit, and then controls the selector 375 to select the COD heater 350 so that the COD heater 350 performs the cold start function in S170.

When the SOC of the high-voltage battery 320 exceeds the predefined limit in S190 while the power generated during regenerative braking is being charged to the high-voltage battery 320 in S180, the controller 370 selects the NO type relay circuit and controls the selector 375 to select the condensate heater 360 so that the condensate heater 360 operates using the residual power in S200.

Thus, both when the outside temperature exceeds the predefined temperature such that the condensate heater 360 performs the COD function, and when the condensate heater 360 operates using the residual power when the SOC of the high-voltage battery 320 exceeds the predefined limit value while the high-voltage battery 320 is being charged with the power generated during regenerative braking, the condensate heater 360 may be heated to dry the condensate.

According to the present disclosure, the condensate produced in the fuel cell may be dried and discharged to the outside, so that the output stability and fuel cell life are increased due to stable hydrogen supply, and driving stability of the industrial vehicle is improved via condensate management.

Various embodiments of the present document may be implemented as software (e.g., a program) including one or more instructions stored in a storage medium (e.g., an internal memory or an external memory) readable by a machine. For example, the machine may invoke and execute at least one of the one or more instructions stored from the storage medium. This enables the machine to operate to perform at least one function according to the invoked at least one instruction. The one or more instructions may include a code generated by a compiler or code that may be executed by an interpreter.

The machine-readable storage medium may be provided in a form of a non-transitory storage medium. In this connection, the term 'non-transitory' means that the storage medium is a device that is tangible and does not include a signal (e.g., electromagnetic waves). The term does not distinguish a case in which data is semi-permanently stored in a storage medium and a case in which data is temporarily stored from each other.

According to one embodiment, the method according to various embodiments disclosed in the disclosure may be provided so as to be included in a computer program product. The computer program product may be traded between sellers and buyers as commodities. The computer program product is distributed in a form of a machine-readable storage medium (e.g. compact disc read only memory (CD-ROM)), or distributed online (e.g. be downloaded or uploaded). In the online distribution, at least a portion of the computer program product may be temporarily stored in a machine-readable storage medium such as a memory of a manufacturer's server, an application store's server, or a relay server or may be created temporarily.

According to various embodiments, each of the above-described components (e.g., a module or program) may include a singular entity or a plurality of entities, and some of the plurality of entities may be arranged in other components.

According to various embodiments, one or more components or operations among the above-described components or operations may be omitted, or one or more other components or operations may be added.

Alternatively or additionally, a plurality of components (e.g., modules or programs) may be integrated into one component. In this case, the integrated component may perform one or more functions of each of the plurality of components in an identical or similar manner to a manner in which a corresponding component among the plurality of components prior performs the same to the integration.

According to various embodiments, operations performed by a module, program, or other components may be executed sequentially, in parallel, repeatedly, or heuristically. One or more of the operations are executed in a different order, or are omitted, or one or more other operations may be added.

As described above, according to the present disclosure, the condensate produced from the fuel cell is dried and discharged to the outside, so that output stability and fuel cell life are increased due to stable hydrogen supply, and driving stability of the industrial vehicle is improved via condensate management. Further, the SOC management of the high-voltage battery may prevent the insulation-breakdown. When there is the reservoir tank, the excavator forcibly lowers the outside temperature to supercharge the air to increase the blow. Thus, the discharge of the condensate is not required. Thus, unnecessary control power waste may be reduced.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for managing condensate of a fuel cell, the apparatus comprising:
   a first heater for applying heat to a coolant of a fuel cell stack;
   a second heater for applying heat to condensate produced in the fuel cell stack; and
   a controller configured to control an operation of the second heater using residual power based on whether at least some of functions of the first heater are activated,
   wherein the residual power includes power generated by residual hydrogen and oxygen, which are remained in the fuel cell stack, reacting with each other such that at least a part of the residual power is consumed by the first heater or the second heater.

2. The apparatus of claim 1, wherein the second heater includes a PTC (Positive Temperature Coefficient) heater disposed inside a reservoir tank for storing the condensate therein.

3. The apparatus of claim 1, wherein the second heater includes a PTC heater having a cylindrical shape disposed inside a pipe in which the condensate flows.

4. The apparatus of claim 1, wherein the controller is configured to operate the first heater to perform a COD (Cathode Oxygen Depletion) function when an outside temperature is lower than a predefined temperature while the fuel cell stack operates.

5. The apparatus of claim 4, wherein the controller is configured to operate the second heater to perform the COD (Cathode Oxygen Depletion) function when the outside temperature is higher than or equal to the predefined temperature while the fuel cell stack operates.

6. The apparatus of claim 1, wherein the controller is configured to operate the second heater with residual power when a SOC (state of charge) of a battery exceeds a predefined limit value while the battery is being charged with power generated during regenerative braking.

7. The apparatus of claim 1, wherein the controller is configured to selectively enable different types of relays connected to the first heater based on the functions of the first heater such that a function of the first heater corresponding to a selected type of relay among the different types of relays is performed,
   wherein when the controller controls the operation of the second heater using the residual power based on whether the at least some of functions of the first heater are activated, the controller is configured to disable the first heater and then enable the second heater.

8. A method for managing condensate of a fuel cell, the method comprising:
   operating a first heater to apply heat to a coolant of a fuel cell stack;

controlling an operation of a second heater using residual power based on whether at least some of functions of the first heater are activated; and operating the second heater to apply heat to condensate produced in the fuel cell stack, wherein the residual power includes power generated by residual hydrogen and oxygen, which are remained in the fuel cell stack, reacting with each other such that at least a part of the residual power is consumed by the first heater or the second heater.

9. The method of claim 8, wherein the method further comprises operating the first heater to perform a COD (Cathode Oxygen Depletion) function when an outside temperature is lower than a predefined temperature while the fuel cell stack operates.

10. The method of claim 9, wherein the method further comprises operating the second heater to perform the COD (Cathode Oxygen Depletion) function when the outside temperature is higher than or equal to the predefined temperature while the fuel cell stack operates.

11. The method of claim 8, wherein the method further comprises operating the second heater with residual power when a SOC (state of charge) of a battery exceeds a predefined limit value while the battery is being charged with power generated during regenerative braking.

12. The method of claim 8, wherein the method further comprises selectively enabling different types of relays connected to the first heater based on the functions of the first heater such that a function of the first heater corresponding to a selected type of relay among the different types of relays is performed, wherein the controlling of the operation of the second heater using the residual power based on whether the at least some of functions of the first heater are activated includes disabling the first heater and then enabling the second heater.

* * * * *